United States Patent [19]
Dorchak et al.

[11] Patent Number: 5,798,088
[45] Date of Patent: *Aug. 25, 1998

[54] METHOD FOR PRODUCING ELEMENTAL SULFUR FROM SULFUR-CONTAINING GASES

[75] Inventors: Thomas P. Dorchak, Morgantown, W. Va.; Santosh K. Gangwal, Durham, N.C.; Scott M. Harkins, Pittsburgh, Pa.

[73] Assignee: Research Triangle Institute, Research Triangle Park, N.C.

[*] Notice: The term of this patent shall not extend beyond the expiration date of Pat. No. 5,366,717.

[21] Appl. No.: 571,118

[22] Filed: Dec. 12, 1995

Related U.S. Application Data

[63] Continuation-in-part of Ser. No. 298,302, Sep. 1, 1994, abandoned, which is a continuation-in-part of Ser. No. 40,077, Mar. 30, 1993, Pat. No. 5,366,717.

[51] Int. Cl.$^6$ .................... B01D 53/50; C01B 17/04
[52] U.S. Cl. .............. 423/567.1; 423/570; 423/244.09; 423/244.1
[58] Field of Search .................... 423/222, 244.07, 423/244.1, 570, 574.1, 576, 576.8, 567.1

[56] References Cited

U.S. PATENT DOCUMENTS

| | | | |
|---|---|---|---|
| 2,697,064 | 12/1954 | Brown | 423/576 |
| 2,724,641 | 11/1955 | Butler et al. | 423/576 |
| 3,764,665 | 10/1973 | Groenendaal et al. | 423/574 |
| 3,931,390 | 1/1976 | Palilla et al. | 423/244 |
| 4,197,277 | 4/1980 | Sugier et al. | 423/231 |
| 4,280,990 | 7/1981 | Jagodzinski et al. | 423/574 R |
| 4,419,337 | 12/1983 | Jagodzinski et al. | 423/574 R |
| 5,242,673 | 9/1993 | Flytzani-Stephanopoulos et al. | 423/570 |
| 5,366,717 | 11/1994 | Dorchak et al. | 423/570 |
| 5,512,260 | 4/1996 | Kiliany et al. | 423/242.1 |
| 5,626,638 | 5/1997 | Valkanas | 48/197 R |

FOREIGN PATENT DOCUMENTS 60-258294 12/1985 Japan.

OTHER PUBLICATIONS

"Sorbent-Based Recovery of Sulfur from Regeneration Tail Gases" by Gangwal, et al.; presented at the 195th ACS National Meeting of Jun. 5–10, 1988; vol. 33, No. 1, pp. 306–309.

*Primary Examiner*—Gary P. Straub
*Assistant Examiner*—Timothy C. Vanoy
*Attorney, Agent, or Firm*—Oblon, Spivak, McClelland, Maier & Neustadt, P.C.

[57] ABSTRACT

A method for producing elemental sulfur and reduced/oxidized sulfur compounds from sulfur containing gases. The method comprises mixing a primary gas stream of sulfur-containing gases with a secondary gas stream to produce a combined gas stream having a preselected stoichiometry and contacting the combined gas stream with a catalyst at a pressure of 7 to 100 atmospheres and a temperature of 540° to 700° C. The catalyst is selected from the group consisting of silica, titania, alumina, sodium/alumina, zinc titanate, alumina or titania promoted with transition metals nickel, cobalt, molybdenum, tungsten, alloys and mixtures thereof and mixture of such catalysts.

5 Claims, 3 Drawing Sheets

5,798,088

METHOD FOR PRODUCING ELEMENTAL SULFUR FROM SULFUR-CONTAINING GASES

This application is a continuation-in-part of U.S. application Ser. No. 08/298,302, filed Sep. 1, 1994 now abandoned, which in turn is a continuation-in-part application of U.S. application Ser. No. 08/040,077, filed Mar. 30, 1993, now U.S. Pat. No. 5,366,717, the entire disclosure of which is incorporated herein -by- reference.

BACKGROUND OF THE INVENTION

1. Field of the Invention

This invention relates to a method for converting gaseous sulfur to elemental sulfur and other specific sulfur compounds. In this particular invention sulfur containing gases are mixed with a preselected secondary gas stream and contacted with a catalyst.

2. Discussion of the Background

Elemental sulfur is a vital raw material which is used in various industrial processes, for example, sulfuric acid production and vulcanization of rubber. Most elemental sulfur is recovered from underground deposits using the thermally inefficient Frasch process or recovered as a by-product of natural gas and petroleum processing. However, underground deposits are dwindling and natural gas and petroleum production in the United States is on the decline. This has lead to concern over the future availability of elemental sulfur. In view of this, sulfur containing gaseous emissions from various industrial processes are beginning to be exploited as sources of elemental sulfur.

Processes are available for producing elemental sulfur from the hydrogen sulfide in coal gas, natural gas or oil refinery sour gas, such as the Stretford process. The Stretford process is a low temperature, wet oxidative scrubbing process. However, the Stretford process has numerous mechanical and process chemistry problems which include odor emissions, sulfur plugging in the towers, slurry basin sulfur deposition, and poor hydrogen sulfide removal efficiencies. Other similar processes use aqueous or glycol media which necessarily limits their operating temperature. Certain dry bed processes are commercially available; however, such processes are temperature limited to below the vaporization temperature of sulfur.

The most common process used to convert hydrogen sulfide to elemental sulfur has been that based on Claus technology. Generally, a preconcentration step is required. The process then oxidizes a portion of the feed gas to sulfur dioxide and reacts it with the nonoxidized portion to yield sulfur and water. Catalysts are used to ensure equilibrium at hourly gas space velocities limited to 700 to 1400 scf/cfh. The water generated in the equilibrium reaction limits the reaction. The ratio of hydrogen sulfide to sulfur dioxide must be strictly controlled as well the excess air. Temperatures are limited to about 600° F. to avoid degradation of the catalyst. Reactions are equilibrium controlled so that the Claus process can only operate on concentrated hydrogen sulfide streams and produces a tail gas which requires further treatment. To overcome the equilibrium problem, various tail-end processes must be tacked onto the Claus, for example Claus/Beavon/IFT or Claus/Beavon/Scot or Claus/CBA. Even the newer SuperClaus process requires multi-staging and in any event require hydrogen sulfide as the starting compound. Thus, the Claus technology is complicated, sensitive and expensive.

Still more complex are those regenerable processes such as the Wellman-Lord process which converts a very dilute sulfur dioxide gas stream, for example from combustion flue gas, to sulfuric acid or elemental sulfur. The Wellman-Lord process uses sodium sulfite to scrub the flue gas. The bisulfite product is thermally decomposed to yield a concentrated $SO_2$ gas stream for sulfuric acid production. Partial reduction of the concentrated $SO_2$ can produce elemental sulfur using augmented Claus technology at the tail end of the process. Another process for the treatment of flue gases is the NOXSO process which uses a reusable sodium alumina sorbent. The sodium content of the catalyst is near 3 percent and reactivity of the sorbent is limited. In the NOXSO process, the sorption takes place near 244° F. and the bed is then heated to temperatures above 1022° F. for regeneration in a reducing gas. Both the Wellman-Lord type process and the NOXSO process are cyclical in regenerating the sorbent, complex and energy intensive.

Thus, it will be recognized that conventional methods for converting gaseous sulfur to elemental sulfur are typically complex, multistage processes. Also, conventional methods generally are operable at either low temperatures or extremely high temperatures, and often concentration of the sulfur containing gases is required.

Therefore, it is an objective of the present invention to provide a method for producing elemental sulfur from sulfur containing gases at high gas space velocities.

It is another objective of the present invention to provide a method for producing elemental sulfur from a gas stream containing reduced and/or oxidized sulfur compounds in a direct, continuous process.

A further objective of the present invention is to provide a method for producing elemental sulfur from sulfur-containing gases which operates at intermediate temperatures.

Yet another objective of the present invention is to provide a method for producing elemental sulfur from sulfur-containing gases which operates efficiently where concentrations of gaseous sulfur in the sulfur-containing feed gas are low.

Another objective of the present invention is to provide a method for producing elemental sulfur from sulfur containing gases which can also be used to convert oxidized gaseous sulfur compounds to reduced sulfur compounds and vice versa.

DISCLOSURE OF THE INVENTION

Other objects and advantages will be accomplished by the present invention which provides a method for producing elemental sulfur and specific sulfur compounds from sulfur containing gases. The method generally comprises the mixing of a primary gas stream of sulfur-containing gases with a secondary gas stream to produce a preselected stoichiometry, and contacting the combined gas stream with a catalyst. The catalyst is selected from the group consisting of silica, alumina, titania, sodium/alumina, zinc titanate, alumina or titania promoted with transition metals including cobalt, nickel, tungsten, molybdenum and mixtures and alloys thereof, and mixtures thereof. For the production of elemental sulfur, contacting of the combined gas stream is preferably accomplished at temperatures in the range of about 247° C. or 300° C. to 700° C. depending on the composition of the gas and pressure. Similarly, the contacting of the combined gas stream with the catalyst is preferably accomplished at pressures in excess of approximately 7 atm, up to and including pressure of 100 atmospheres. High space velocities of up to 50,000 scc/(cc.h) are employed.

BRIEF DESCRIPTION OF THE DRAWINGS

The above-mentioned steps of the present invention will become more clearly understood from the following detailed description of the invention read together with the drawings in which.

BEST MODE FOR CARRYING OUT THE INVENTION

Figure 1:
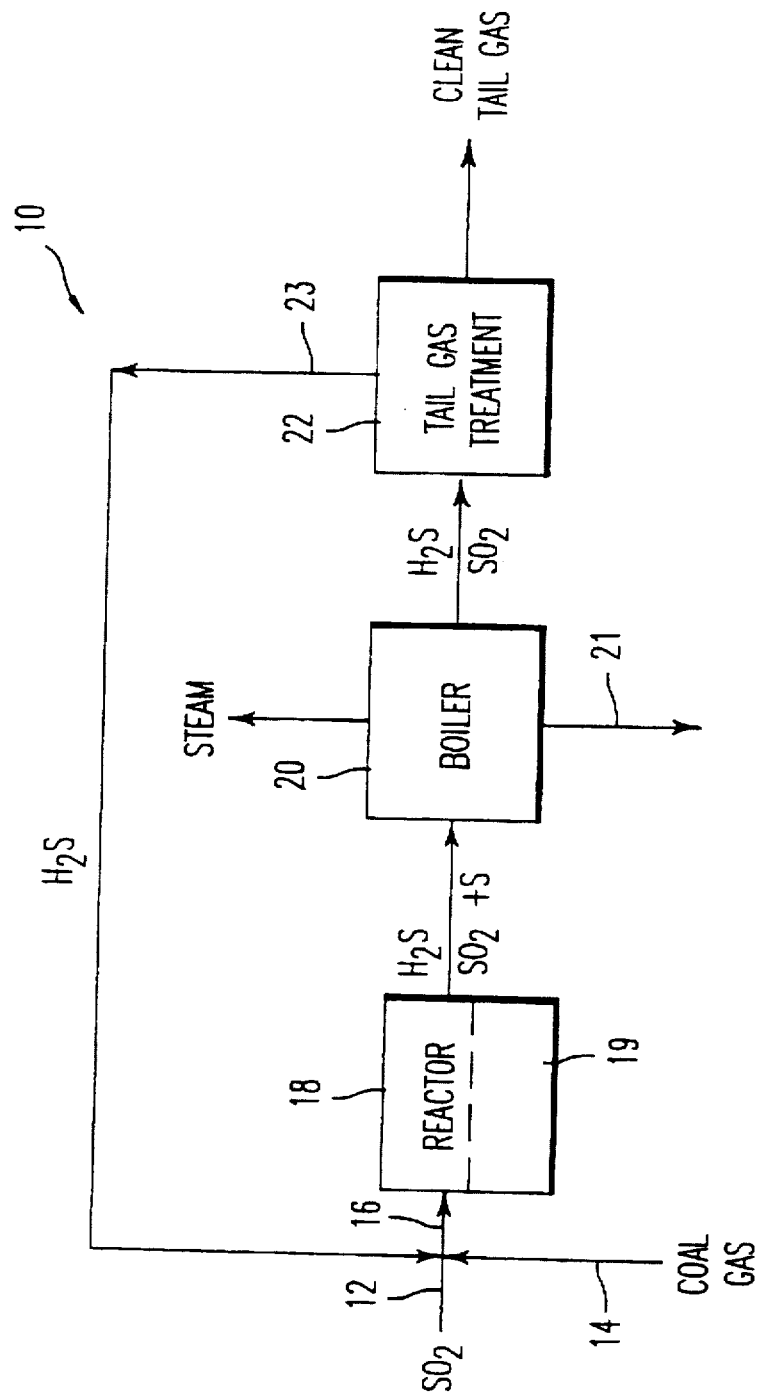
FIG. 1 illustrates a schematic diagram of a system for implementing the method of the present invention.

The present invention provides a method for converting the sulfur in gas streams containing gaseous sulfur compounds such as hydrogen sulfide, carbonyl sulfide and sulfur dioxide to elemental sulfur. However, as will be discussed below, the method of the present invention can be used, under alternative conditions, to convert oxidized gaseous sulfur compounds such as sulfur dioxide to reduced sulfur compounds such as hydrogen sulfide, and vice versa. Thus, whereas the discussion below is directed primarily to the method as applied to the production of elemental sulfur it will be understood that the present invention is not limited in use to the production of elemental sulfur.

The method of the present invention generally comprises the mixing of a primary gas stream of sulfur-containing gas with a secondary gas stream of selected composition, and contacting the resulting combined gas stream with a preselected catalyst at temperatures of about 247° C. to 700° C. The composition of the secondary gas stream will vary depending upon the composition of the primary gas stream, with the object being that the resulting combined stream have a stoichiometry conducive to substantially complete conversion of the sulfur gases to the desired product, whether it be elemental sulfur or reduced/oxidized sulfur gases. In this regard, if elemental sulfur is the desired product, the mixture of primary and secondary gas streams should have close to such stoichiometry that the sulfur gases can be completely converted to elemental sulfur. Examples of such desirable stoichiometries are as follows:

$$SO_2 + 2H_2 \rightarrow 2H_2O + S$$

$$SO_2 + 2CO \rightarrow 2CO_2 + S$$

$$SO_2 + 2H_2S \rightarrow 2H_2O + 3S$$

$$H_2S + (½)O_2 \rightarrow H_2O + S$$

Thus, if the primary gas stream contains mainly oxidized sulfur gases the secondary gas stream will be reducing in nature, e.g., containing hydrogen and carbon monoxide, individually or in combination. It is permissible to have oxidizing gases such as stream and carbon dioxide in the secondary stream as long as the secondary gas stream is overall reducing in nature. On the other hand, if the primary gas stream contains mainly reduced sulfur gases, the secondary gas stream will be oxidizing in nature, e.g. containing sulfur dioxide, oxygen, and/or air. Of course, if the primary gas stream already has close to the desired stoichiometry the secondary gas stream is not required.

As noted above, the method of the present invention can also be used to convert oxidized sulfur gases to reduced sulfur gases, and vice versa, this being accomplished by shifting the primary/secondary gas stream mixture stoichiometry toward the desired gas and by selection of the appropriate temperature for the desired conversion. An example of the desired stoichiometries would be:

$$SO_2 + 3H_2 \rightarrow H_2S + 2H_2O$$

$$SO_2 + 3CO \rightarrow COS + 2CO_2$$

The catalyst used pursuant to the method of the present invention is selected from a group consisting of silica, alumina, titania, sodium/alumina, zinc titanate, alumina or titania promoted with transition metals and mixtures thereof. In the preferred application of the method the catalyst is in the form of pellets and a reactor having a single fixed bed of catalyst is used. It will, however, be recognized by those skilled in the art that reactor modifications including multistage systems, moving-bed and fluidized-bed systems can also be used. The primary gas stream, having been mixed with a small flow of the appropriate secondary gas stream, is contacted with the catalyst bed at temperatures of about 247° C. to 700° C. or higher, thereby effecting the conversion of the sulfur gases to elemental sulfur.

The preferred operating conditions under which the combined primary and secondary gas streams are contacted by the catalyst for recovery of elemental sulfur include temperatures on the order of 247° C. to 700° C., and space velocities (in fixed beds) from 1,000 to 10,000 and up to and greater than 50,000 scc/(cc.h), at pressures of about 7 to 100 atm. Pressures of 10–100 atm. are preferred, with a range of 20–70 atm. being particularly preferred. The process is capable of treating/using a variety of commercial gases e.g. coal gas from certain gasifiers that operate at up to 80 atm. (e.g. Texaco gasifier) and natural sour gases from gas wells at up to 100 atm. For economical reasons, the pressure in particular, the higher end of the pressure range should be the same as the pressure at which the gases are delivered to the process.

However, the preferred operating conditions cited above are simply illustrative of those which maximize the elemental sulfur yield. Conversion to elemental sulfur can be accomplished at temperatures below, e.g., 247° C. and at pressures below, e.g., 10 atm.

The following examples demonstrate various applications of the method of the present invention and typical conversion rates which can be achieved.

EXAMPLE 1

A reducing gas-SO$_2$ combination containing 5.7 percent H$_2$O, 1.8 percent SO$_2$, 0.6 percent CO$_2$, 1.5 percent H$_2$, 2.2 percent CO, and balance N$_2$ flowing through a fixed bed of a specially prepared and presulfated sodium alumina catalyst, resulted in a 92.3 percent conversion of the inlet sulfur to elemental sulfur at a temperature of 700° C. and a pressure of 20 atm at a space velocity of 1750 scc/(cc.h).

EXAMPLE 2

A reducing gas-SO$_2$ combination containing 7.7 percent H$_2$O, 1.8 percent SO$_2$, 0.6 percent CO$_2$, 1.6 percent H$_2$, 2.1 percent CO, and balance N$_2$, flowing through a fixed bed of a specially prepared and presulfated sodium alumina catalyst at a space velocity of 1750 scc/(cc.h), resulted in a 91 percent conversion of the inlet sulfur to elemental sulfur at a temperature of 650° C. and a pressure of 20 atm.

EXAMPLE 3

A reducing gas-SO$_2$ combination containing 7.7 percent H$_2$O, 1.8 percent SO$_2$, 0.6 percent CO$_2$, 1.6 percent H$_2$, 2.1 percent CO, and balance N$_2$, flowing through a fixed bed of a specially prepared and presulfated sodium alumina catalyst at a space velocity of 1750 scc/(cc.h), resulted in a 23 percent conversion of the inlet sulfur to elemental sulfur at a temperature of 650° C. and essentially atmospheric pressure. Inlet flow was then reduced to give a space velocity of 429 scc/(cc.h). Conversion to elemental sulfur rose to 46.2%. Raising the bed temperature to a temperature of 700° C. had no significant impact on the extent of conversion. Pressure was then raised to a pressure of 20 atmospheres and flow adjusted to 1753 scc/(cc.h). Conversion rose to 88.2%.

EXAMPLE 4

An oxidizing gas-$H_2S$ combination containing, 1.5 percent $H_2S$, 0.6 percent COS, 1.8 percent $O_2$, and balance $N_2$, flowing through a fixed bed of a specially prepared and presulfated sodium alumina catalyst at a space velocity of 1750 scc/(cc.h), resulted in a 88.2 percent conversion of the inlet sulfur to elemental sulfur at a temperature of 600° C. and a pressure of 20 atm. Reaction temperature was reduced to a temperature of 540° C. at constant space velocity, and the conversion to elemental sulfur was 89.4 percent. Reaction temperature was reduced to a temperature of 500° C. at constant space velocity, and the conversion to elemental sulfur was 87.6 percent.

EXAMPLE 5

A reducing gas-$SO_2$ combination containing 11.5 percent $H_2O$, 0.87 percent $SO_2$, 0.25 percent $CO_2$, 0.68 percent $H_2$, 0.88 percent CO, and balance $N_2$, flowing through a fixed bed of a specially prepared and presulfated sodium alumina catalyst at a space velocity of 1830 scc/(cc.h), resulted in a 93.5 percent conversion of the inlet sulfur to elemental sulfur at a temperature of 650° C. and a pressure of 40 atm. Reaction temperature was reduced to a temperature of 602° C. at constant space velocity and the conversion to elemental sulfur was 93.1 percent. Reaction temperature was reduced to a temperature of 552° C. at constant space velocity, and the conversion to elemental sulfur was 93.4 percent. Reaction temperature was reduced to a temperature of 489° C. at constant space velocity, and the conversion to elemental sulfur was 94.5 percent. Reaction temperature was reduced to a temperature of 449° C. at constant space velocity, and the conversion to elemental sulfur was 91.1 percent. Reaction temperature was reduced to a temperature of 392° C. at constant space velocity, and the conversion to elemental sulfur was 75.9 percent.

EXAMPLE 6

A reducing gas-$SO_2$ combination containing 24.4 percent $H_2O$, 1.5 percent $SO_2$, 0.5 percent $CO_2$, 1.3 percent $H_2$, 1.7 percent CO, and balance $N_2$, flowing through a fixed bed of a commercial Claus type catalyst, S-100 Alcoa alumina catalyst, resulted in a 93.3 percent conversion of the inlet sulfur to elemental sulfur at a temperature of 650° C. and a pressure of 20 atm at a space velocity of 2150 scc/(cc.h).

EXAMPLE 7

A reducing gas-$SO_2$ combination containing 7 percent $H_2O$, 1.8 percent $SO_2$, 0.6 percent $CO_2$, 1.6 percent $H_2$, 2.0 percent Co, and balance $N_2$, flowing through a fixed bed of a commercial Claus type catalyst, SP-100 Alcoa sodium alumina catalyst, resulted in a 93.2 percent conversion of the inlet sulfur to elemental sulfur at a temperature of 645° C. and a pressure of 20 atm at a space velocity of 1750 scc/(cc.h). As flow was increased and space velocity ranged to 5060 scc/(cc.h), conversion to elemental sulfur was 90.0 percent.

EXAMPLE 8

A reducing gas-$SO_2$ combination containing 16 percent $H_2O$, 1.6 percent $SO_2$, 0.5 percent $CO_2$, 1.4 percent $H_2$, 1.8 percent CO, and balance $N_2$, flowing through a fixed bed of a commercial Claus type catalyst, S-100 Alcoa alumina catalyst, resulted in a 88.8 percent conversion of the inlet sulfur to elemental sulfur at a temperature of 645° C. and a pressure of 20 atm at a space velocity of 5560 scc/(cc.h). As flow was increased and space velocity ranged to near 10,000 scc/(cc.h), conversion to elemental sulfur was 85.3 percent. As flow was increased and space velocity ranged to near 20,000 scc/(cc.h), conversion to elemental sulfur was 52.3 percent.

EXAMPLE 9

A reducing gas-$SO_2$ combination containing 3.7 percent $H_2O$, 1.9 percent $SO_2$, 0.6 percent $CO_2$, 1.6 percent $H_2$, 2.1 percent CO, and balance $N_2$, flowing through a fixed bed of a commercial catalyst, T-1571 UCI silica, resulted in a 93.2 percent conversion of the inlet sulfur to elemental sulfur at a temperature of 645° C. and a pressure of 20 atm at a space velocity of 1690 scc/(cc.h).

EXAMPLE 10

A reducing gas-$SO_2$ combination containing 7.9 percent $H_2O$, 1.8 percent $SO_2$, 0.6 percent $CO_2$, 1.6 percent $H_2$, 2.0 percent CO, and balance $N_2$, flowing through a fixed bed of a zinc titanate catalyst, L-3014 UCI, resulted in a 94.42 percent conversion of the inlet sulfur to elemental sulfur at a temperature of 600° C. and a pressure of 20 atm at a space velocity of 1690 scc/(cc.h).

EXAMPLE 11

A gas representative of a gas treated by a first stage of the invented process after sulfur condensation containing 34 percent $H_2O$, 0.04 percent $SO_2$, 0.08 percent $H_2S$, 0.4 percent $CO_2$, and balance $N_2$, flowing through a fixed bed of a commercial Claus type catalyst, S-100 Alcoa alumina, resulted in a 79.5 percent conversion of the inlet sulfur to elemental sulfur at a temperature of 300° C. and a pressure of 20 atm at a space velocity of 2900 scc/(cc.h). At a reaction temperature of 650° C. at a near constant space velocity, the conversion to elemental sulfur was 52.0 percent.

EXAMPLE 12

A potentially reactive gas combination containing 8 percent $H_2O$, 1 percent $SO_2$, 2 percent $H_2S$, 37.3 percent CH4, and balance $N_2$ flowing through a fixed bed of a commercial Claus type catalyst, S-100 Alcoa alumina, resulted in a 98.3 percent conversion of the inlet sulfur to elemental sulfur at a temperature of 400° C. and a pressure of 20 atm at a space velocity of 1890 scc/(cc.h). Under the selected conditions, the methane remained inert.

EXAMPLE 13

A reducing gas-$SO_2$ combination containing 11.47% $H_2O$, 0.87% $SO_2$, 0.25 $CO_2$, 0.68% $H_2$, 0.88% CO, and balance $N_2$ flowing through a 1" diameter fixed-bed of a specially prepared and presulfated sodium alumina catalyst resulted in a 93.5% conversion of the inlet sulfur to elemental sulfur at a temperature of 650° C. and a pressure of 40 atmospheres at a space velocity of 1828 scc/(cc.h). The conversion was then measured at several additional temperatures with other conditions being identical. Conversion was 93.1 %, 93.4%, 94.5%, 91.1%, and 75.9% at temperatures of 602° C., 552° C., 489° C., 449° C., and 392° C.

EXAMPLE 14

A reducing gas-$SO_2$ combination containing 6.42% $H_2O$, 1.84% $SO_2$, 0.59% $CO_2$, 1.58% $H_2$, 2.07% CO, and balance $N_2$ flowing through a 1" diameter fixed-bed of a T-375 ³⁄₁₆"×³⁄₁₆" UCI-alumina catalyst resulted in a 92.4% conversion of the inlet sulfur to elemental sulfur at a temperature of 650° C. and a pressure of 20 atmospheres at a space velocity of 1735 scc/(cc.h).

EXAMPLE 15

A reducing gas-$SO_2$ combination containing 11.36% $H_2O$, 1.72% $SO_2$, 0.55% $CO_2$, 1.52% hydrogen, 1.96% CO, and balance $N_2$ flowing through a 1" diameter fixed-bed of a L-3014 UCI zinc titanate catalyst resulted in a 95.2% conversion of the inlet sulfur to elemental sulfur at a temperature of 598° C. and a pressure of 20 atmospheres at a space velocity of 5257 scc/(cc.h).

EXAMPLE 16

Same as Example 15 except temperature was 648° C., space velocity was 5540 scc/(cc.h), and gas composition was 14.33% $H_2O$, 1.66% $SO_2$, 0.54% $CO_2$, 1.46% $H_2$, 1.89% CO, and balance $N_2$. The conversation to elemental sulfur was 94.0%.

EXAMPLE 17

Same as Example 16 except temperature was 544° C., space velocity was 5506 scc/(cc.h), and gas composition was 15.36% $H_2O$, 1.64% $SO_2$, 0.53% $CO_2$, 1.45% $H_2$, 1.87% CO and balance $N_2$. The conversion to elemental sulfur was 93.1%.

EXAMPLE 18

A reducing gas-$SO_2$ combination containing 15.62% $H_2O$, 1.64% $SO_2$, 0.53% $Co_2$, 1.42% $H_2$, 1.87% CO and balance $N_2$ flowing through a 1" diameter fixed-bed of S-100 Alcoa Alumina catalysts resulted in a 92.6% conversion of the inlet sulfur to elemental sulfur at a temperature 647° C. and a pressure of 20 atmospheres at a space velocity of 5523 scc/(cc.h). The conversion dropped to 89.1% when the temperature was dropped to 603° C., other conditions being equal. At 603° C., the pressure was dropped in stages to first 10 atmospheres and second 5 atmospheres. The conversion at 10 atmospheres was 60.4% and at 5 atmospheres was 31.0%.

EXAMPLE 19

A reducing gas-$SO_2$ combination containing 2.01% $SO_2$, 0.82% $CO_2$, 2.15% $H_2$, 0.09% $H_2S$, 1.97% CO, and balance $N_2$, flowing through a fixed-bed of L-3014 UCI zinc titanate catalyst resulted in a 93.5% conversion of the inlet sulfur to elemental sulfur at a temperature of 650° C. and a pressure of 20 atmospheres at a space velocity of 2000 scc/(cc.h). When the temperature was dropped to 547° C., conversion increased to 94.6%. When the temperature was dropped further to 455° C., conversion dropped to 84.0%. The temperature was then increased to 650° C. and pressure dropped to 7 atmospheres. The conversion was only 80.8% as opposed to 93.5% at 20 atmospheres.

EXAMPLE 20

A reducing gas-$SO_2$ combination containing 14.35% $H_2O$, 1.73% $SO_2$, 0.57% $CO_2$, 1.53% $H_2$, 2.00% CO, and balance $N_2$ passed through a fixed-bed containing 25 cc of presulfided UCI T-306 molybdenum oxide promoted alumina (⅛" pellets) at a pressure of 20 atmospheres and a temperature of 640° C. at a space velocity of 5313 scc/(cc.h) resulted in a 93.1% conversion of the inlet sulfur to elemental sulfur. As temperature was dropped to 552° C. and 451° C., the conversion changed very little and was 94.1% and 94.5% respectively.

EXAMPLE 21

The process of Example 20 was scaled up by a factor 40. A reducing gas-$SO_2$ combination containing 5.0% $H_2O$, 1.84% $SO_2$, 0.69% $SO_2$, 1.38% $H_2$, 0.07% $H_2S$, 2.09% CO, and balance $N_2$ pass through a 3" diameter fixed-bed of 1,000 cc of presulfided UCI T-306 molybdenum oxide promoted alumina (⅛" pellets) at a pressure of 21.4 atmospheres and a temperature of 590° C. at a space velocity of 5,000 scc/(cc.h) resulted in a 95% conversion of the inlet sulfur to elemental sulfur.

EXAMPLE 22

The effect of pressure on the scaled up process of EXAMPLE 21 was tested. A reducing gas-$SO_2$ combination containing 10% $H_2O$, 1.6% $SO_2$, 0.61% $CO_2$, 1.21% $H_2$, 1.88% CO, 0.05% $H_2S$, and balance $N_2$ passed through the bed of Example 9 at 21.4 atmospheres pressure and a temperature of 610° C. at a space velocity of 1250 scc/(cc.h) resulted in a 95.6% conversion of the inlet sulfur to elemental sulfur. When the pressure was dropped to 9.8 atmospheres, the conversion dropped to 84.9%. The pressure was increased back to 21.4 atmospheres and the temperature was increased to 660° C. The gas was changed to 10.0% $H_2O$, 1.64% $SO_2$, 1.3% $H_2$, 0.64% $CO_2$, 1.83% CO, 0.06% $H_2S$ and balance $N_2$. The conversion to sulfur increased to 91.1%. When the pressure was now dropped to 3.4 atmospheres the conversion dropped dramatically to 51.0%. A further drop in pressure to 1.7 atmospheres resulted in a further drastic drop in conversion to 18.1%.

EXAMPLE 23

A $H_2S$—COS—$SO_2$ combination containing 13% $H_2O$, 1.26% $H_2S$, 0.3% COS, 0.81% $SO_2$, and balance $N_2$ passed through a 1" diameter fixed-bed of S-100 Alcoa alumina catalyst at a temperature of 654° C., pressure of 20 atmospheres, at a space velocity of 2300 scc/(cc.h) resulted in a 94.7% conversion of the inlet sulfur to elemental sulfur. When the pressure was reduced to 10 atm, conversion to elemental sulfur fell to 90.3%. When the temperature was reduced to 562° C. at 20 atm, the conversion was 93.9%.

EXAMPLE 24

A $H_2S$—$SO_2$ combination containing 15.03% $H_2O$, 2.53% $H_2S$, 1.26% $SO_2$, and balance $N_2$ passed through a 1" diameter fixed-bed of S-100 Alcoa alumina catalyst at a temperature of 653° C. process of 20 atm, and a space velocity of 2354 scc/(cc.h), resulted in a 96.8% conversion of the inlet sulfur to elemental sulfur. When the temperature was reduced under these conditions to 466° C. and 303° C., respectively, the conversion was 96.5% and 97.7% respectively. When the pressure was reduced to 7 atm and the temperature increased to 590° C. the conversion fell to 91.7%.

EXAMPLE 25

$H_2S$—$SO_2$ gas representative of a gas treated by a first stage of the inventive process after sulfur condensation containing 0.1038% $H_2S$, 0.0531% $SO_2$, 14.18% $H_2O$, 0.51% $CO_2$, and balance $N_2$ passed through a 1" diameter fixed-bed of UCI T-306 $MoO_2$ on $Al_2O_3$ catalyst at a temperature of 393° C., a pressure of 20 atmosphere, and a space velocity of 2308 scc/(cc.h) resulted in a 77.7% conversion of the inlet sulfur to elemental sulfur. When the temperature was reduced to 321° C. and 260° C., the conversion was 79.1% and 84.0% respectively. When the pressure was reduced to 7 atmosphere, the conversions at 393° C., 329° C., and 247° C. were 47%, 45.4% and 62.9% respectively.

EXAMPLE 26

A $H_2S$—$O_2$ combination containing 6.46% $H_2S$, 3.23% $O_2$, 8.14% $H_2O$, and balance $N_2$ passed through a 1" diameter fixed-bed of UCI L-3014 zinc titanate at a temperature of 354° C., pressure of 20 atm, and a space velocity of 4254 scc/(cc.h) resulted in a 98.2% conversion of the inlet sulfur to elemental sulfur. When the pressure was dropped to 7 atm, the conversion dropped to 79.4%. When the temperature was dropped to 327° C. at 20 atm the conversion was 85.7%. Again at 327° C. the pressure was dropped to 7 atm the comparison fell to 49.0%. When the pressure was further dropped to 2 atm at this condition, the conversion fell drastically to only 34%.

EXAMPLE 27

The scaled-up process of Example 21 was demonstrated with actual coal gas from a coal gasifier. A simulated 1.8% $SO_2$ in $N_2$ stream was mixed with an actual coal gasifier gas generated from a fluidized-bed coal gasifier. The volumetric composition of the gasifier gas was 1.97% $CH_4$, 14.9% $H_2$, 11.5% $CO_2$, 9.87% CO, 11.0% H2O, 0.25% $H_2S$, 40 ppm HCl, 800 ppmv $NH_3$, traces of heavy metal vapors such as As and Se and balance $N_2$. The hot coal gasifier gas was mixed with the simulated $SO_2$ stream to yield a $H_2$+CO to $SO_2$ ratio close to 2.0 and passed through the 3-inch diameter fixed bed of 1000 cc of presulfided UCI T-306 molybdenum oxide promoted alumina (⅛" pellets) at a pressure of 18.7 atm, a temperature of 550° C., and a space velocity of 4,560 scc/(cc.h). The total $SO_2$ conversion over the first 56 minutes ranged from 98.0 to 99.7%. All of the $SO_2$ that was converted was converted to elemental sulfur. When the ($H_2$+CO)/$SO_2$ ratio was increased slightly over 2.0, 100% of $SO_2$ was converted from 117 to 199 minutes of the run. Of the $SO_2$ converted, 95.1 to 98.4% was converted to elemental sulfur and the remaining was converted to $H_2S$.

Referring now to the Figures, in FIG. 1 an example of one preferred application of the method of the present invention is schematically illustrated at 10. For purposes of illustration and by way of one example, the primary gas stream, referenced at 12, is depicted as regeneration off-gas which will be used as one preferred primary gas stream sources, typically provided at a temperature on the order of 700°0 C., at a pressure of approximately 25 atm, with $SO_2$ concentrations of approximately 2 mole %. The secondary gas stream, referenced at 14, is depicted as coal gas, the secondary stream 14 being reducing in nature. As illustrated, the primary and secondary gas streams are mixed at 16 and directed into the sulfur production reactor 18 to be contacted by the fixed bed of catalyst therein shown at 19. The resulting $H_2S$, $SO_2$ and S are fed to a sulfur condenser/steam boiler 20 where the molten elemental sulfur condensate is removed through line 21 leaving tail gases of $H_2S$ and $SO_2$. The tail cases can then be treated by a conventional Shell Claus Off-gases Treating (SCOT) process 22. As illustrated the $H_2S$ rich overhead produced from the SCOT process is recycled through line 23 to be mixed with the primary stream 12 such that the further conversion to elemental sulfur can be effected and the clean tail gases, having an environmentally safe sulfur content of less than 250 ppmv, can be released into the environment.

Figure 2:
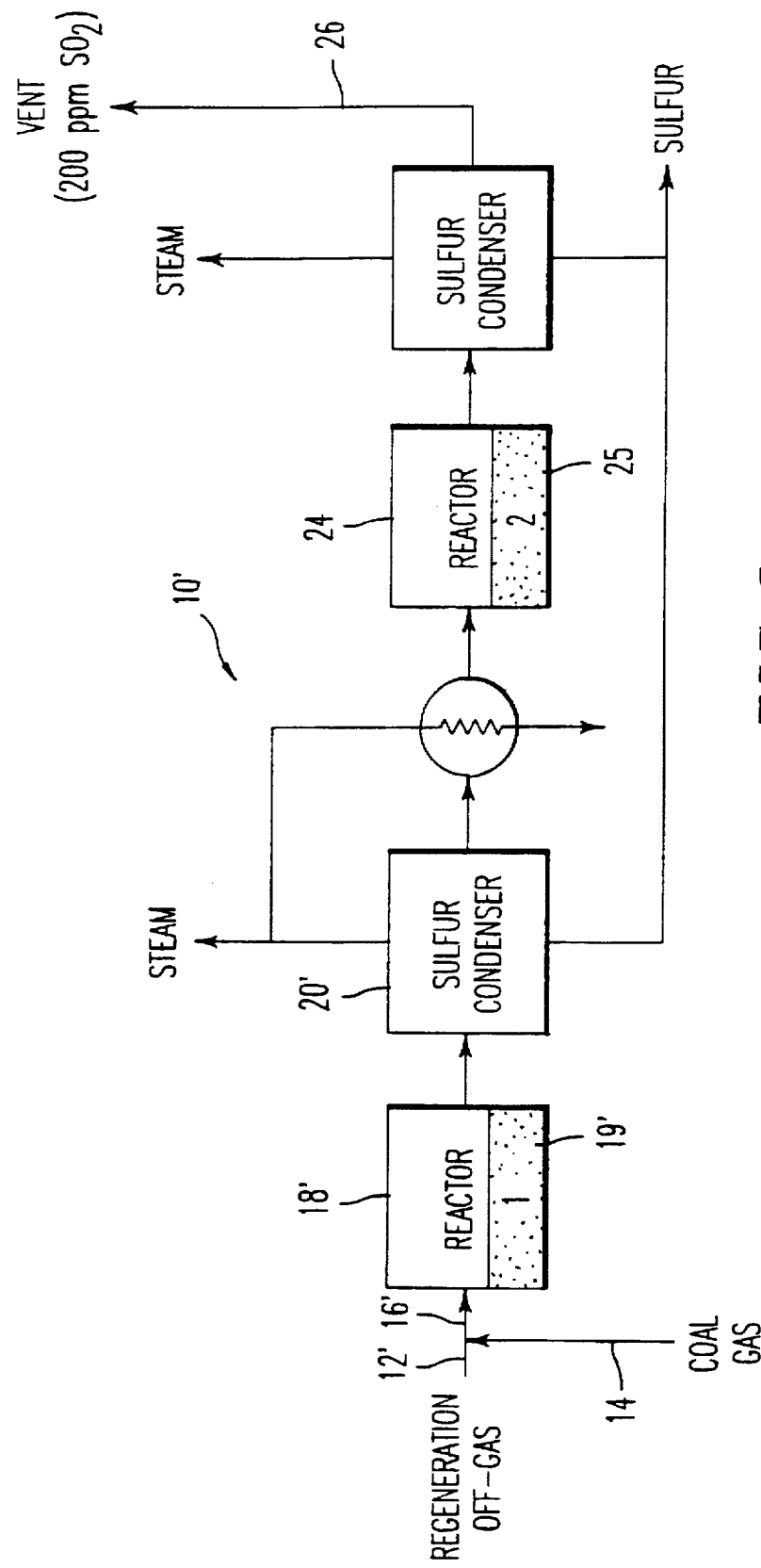
FIG. 2 illustrates a schematic diagram of an alternative system for implementing the method of the present invention.

In FIG. 2 an alternative system for applying the method of the present invention is illustrated at 10'. It will be noted that the system 10' is a multiple bed system including a sulfur production reactor 18' having a catalyst bed 19', an intercooler 20' and a tail-gas polishing reactor 24 having a catalyst bed 25. Thus, it will be recognized that rather than utilizing the SCOT process to clean the tail gas remaining after initial conversion by the reactor 18', the second reactor 24 is used to effect further conversions of sulfur and thereby clean the tail gas being discharged from reactor 24 through line 26 so as to leave only traces of $SO_2$.

Figure 3:
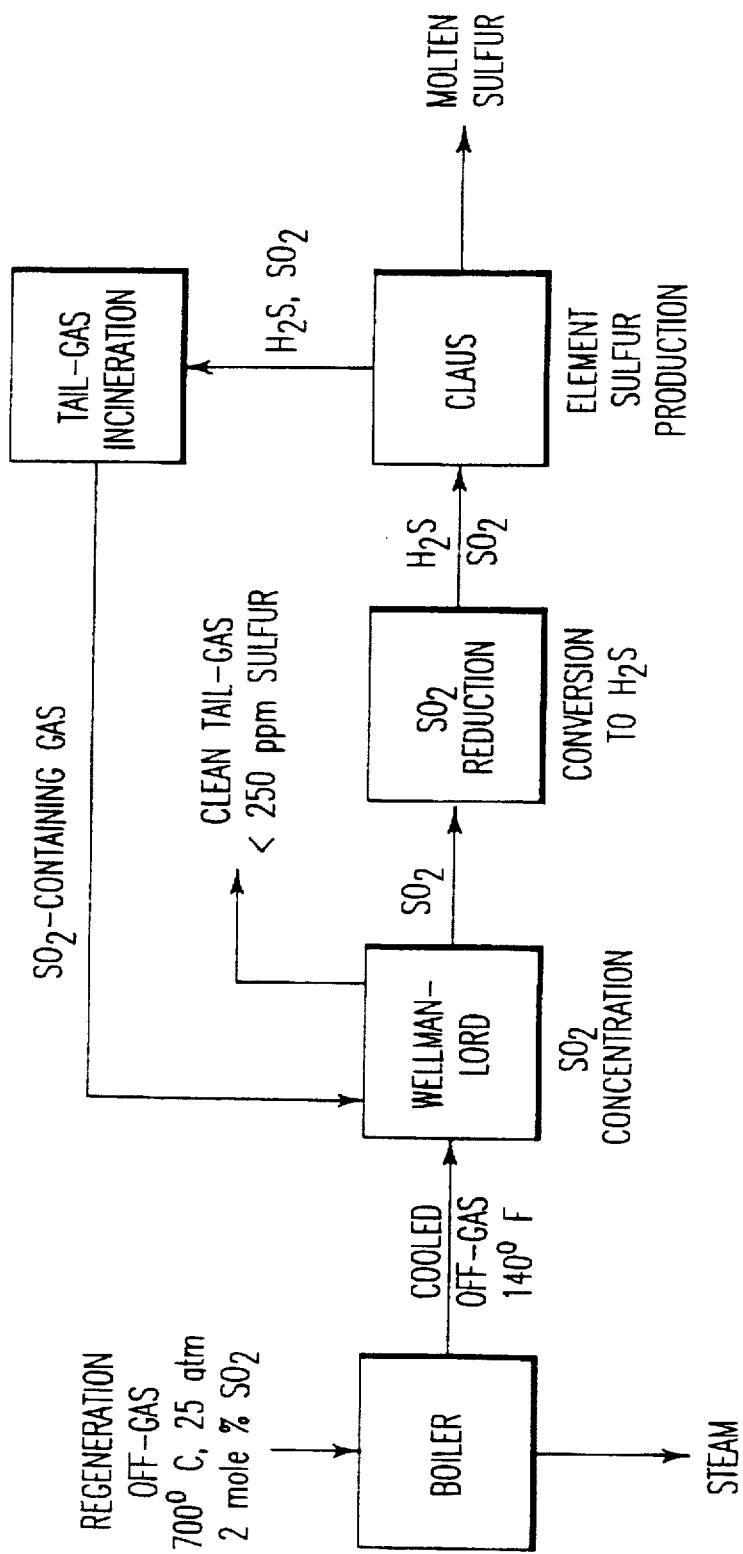
FIG. 3 is a schematic diagram of a conventional system for producing elemental sulfur from sulfur-containing gases.

The advantages of the method of the present invention can be readily seen by comparing the systems of FIGS. 1 and 2 with a conventional sulfur producing system based on Claus technology illustrated in FIG. 3. Because a Claus plant is not suited for elemental sulfur production at such low concentrations of $SO_2$ the $SO_2$ must be concentrated, as by the Wellman-Lord process, which requires that the sulfur-containing gas first be cooled. Two thirds of the concentrated $SO_2$ must then be converted to $H_2S$ before conversion to elemental sulfur can be effected in the three stages of the Claus reactor. By contrast, where the method of the present invention is used, the primary regeneration off-gas need not be concentrated. Regeneration off-gases are typically within the preferred temperature range of the method, and the method is suitable for conversion to elemental sulfur even where $SO_2$ concentrations are very small. Accordingly, rather that a multiple step, stage by stage process such as those currently used, the method of the present invention is essentially a one step, continuous process which results in elemental sulfur conversion greater than 90%. A second stage is only necessary if over 99% recovery is needed. The method operates over a wide range of temperatures. The process is insensitive to catalyst properties deemed important in the Claus process, such as specific surface area which is adversely affected by thermal gradation.

While one preferred application of the method of the present invention has been shown and described, it will be understood that there is no intent to limit the invention to such disclosure, but rather it is intended to cover all modifications and alternate methods, and alternative gas compositions falling within the spirit and scope of the invention as defined in the appended claims. For example, although examples were shown only for molybdenum—promoted alumina catalyst, it is well recognized in the art that if molybdenum—promoted catalyst is effective for the process, other transition metals and combinations thereof such as tungsten, cobalt-tungsten, cobalt-molybdenum, nickel-tungsten, nickel-molybdenum and others containing primary and/or secondary promoters on other catalyst supports (which themselves are catalysts) such as silica and titania will also be effective.

What is claimed as new and desired to be secured by Letters Patent of the United States is:

1. A method for producing elemental sulfur and sulfur compounds from sulfur containing gases, comprising mixing a primary gas stream consisting essentially of sulfur dioxide with a secondary reducing gas stream comprising at least one of hydrogen or carbon monoxide to prepare a gaseous mixture feed material, contacting a catalyst selected from the group consisting of silica, alumina, sodium impregnated alumina, zinc titanate, titania and transition metals selected from the group consisting of nickel, cobalt, tungsten, molybdenum, mixtures and alloys of these transition metals supported on alumina or titania with said feed material, at a pressure of 7–100 atmospheres and a temperature of 54° C.–700° C., and recovering 52.3–99.7% of the sulfur containing gases of said primary gas stream as elemental sulfur and reduced sulfur compounds from the product of said catalyst/feed material contacting step.

2. The process of claim 1 where the pressure is in the range of 7–40 atm.

3. The process of claim 1 whee the space velocity is in the range of 1000–50,000 scc/(cc.h).

4. The process of claim 1 wherein 75.9–98.4% of the sulfur in the feed material is converted to elemental sulfur and recovered as the same.

5. The process of claim 1 wherein the reducing gas stream consists of at least one of $H_2$ and CO and of hydrogen sulfide.

* * * * *